Oct. 9, 1928.
C. H. LAND
1,686,698
TRACTOR TRAILER
Filed May 4, 1927
2 Sheets-Sheet 1
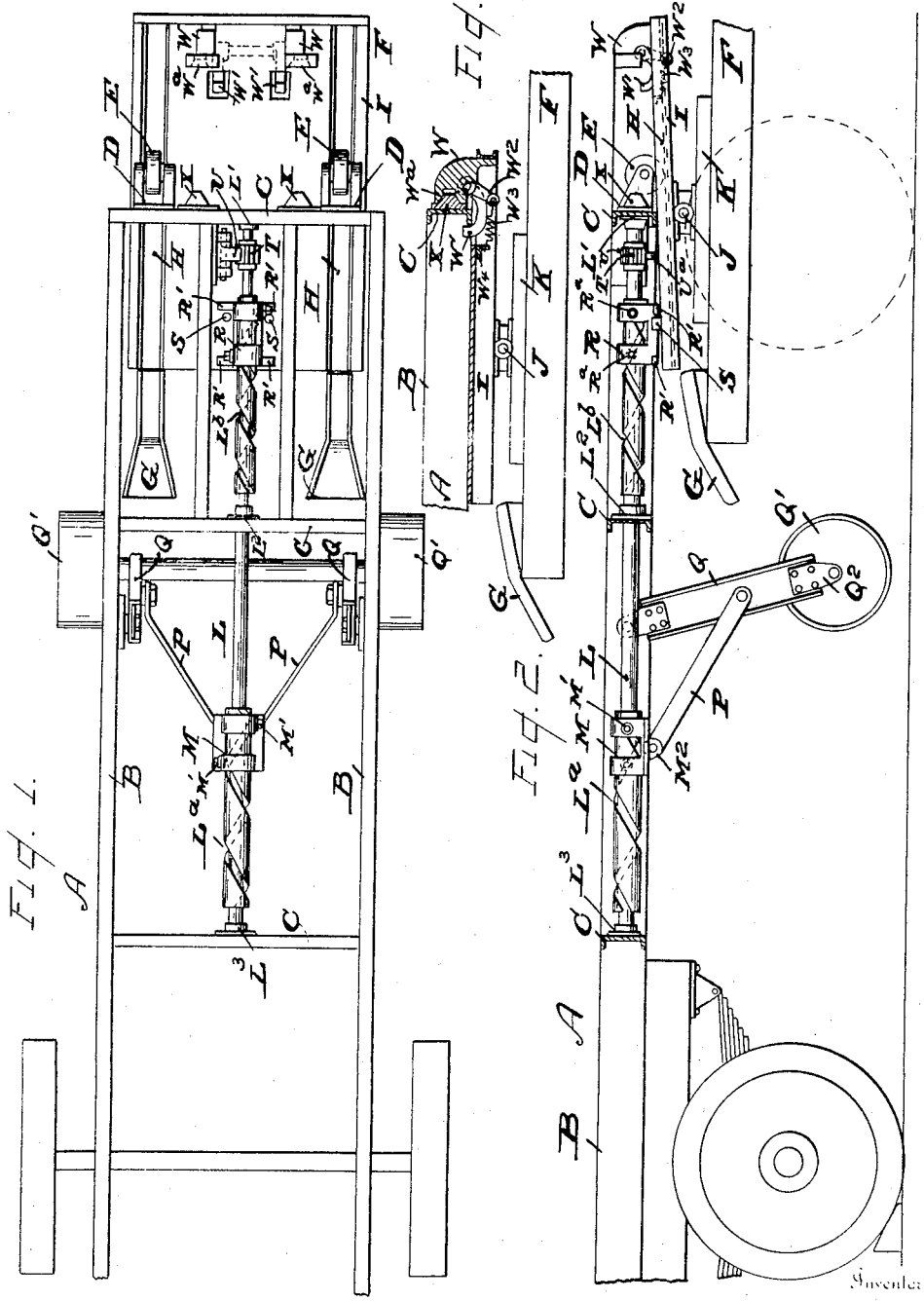
Charles H. Land
S. E. Thomas Oct. 9, 1928.
C. H. LAND
1,686,698
TRACTOR TRAILER
Filed May 4, 1927 2 Sheets-Sheet 2
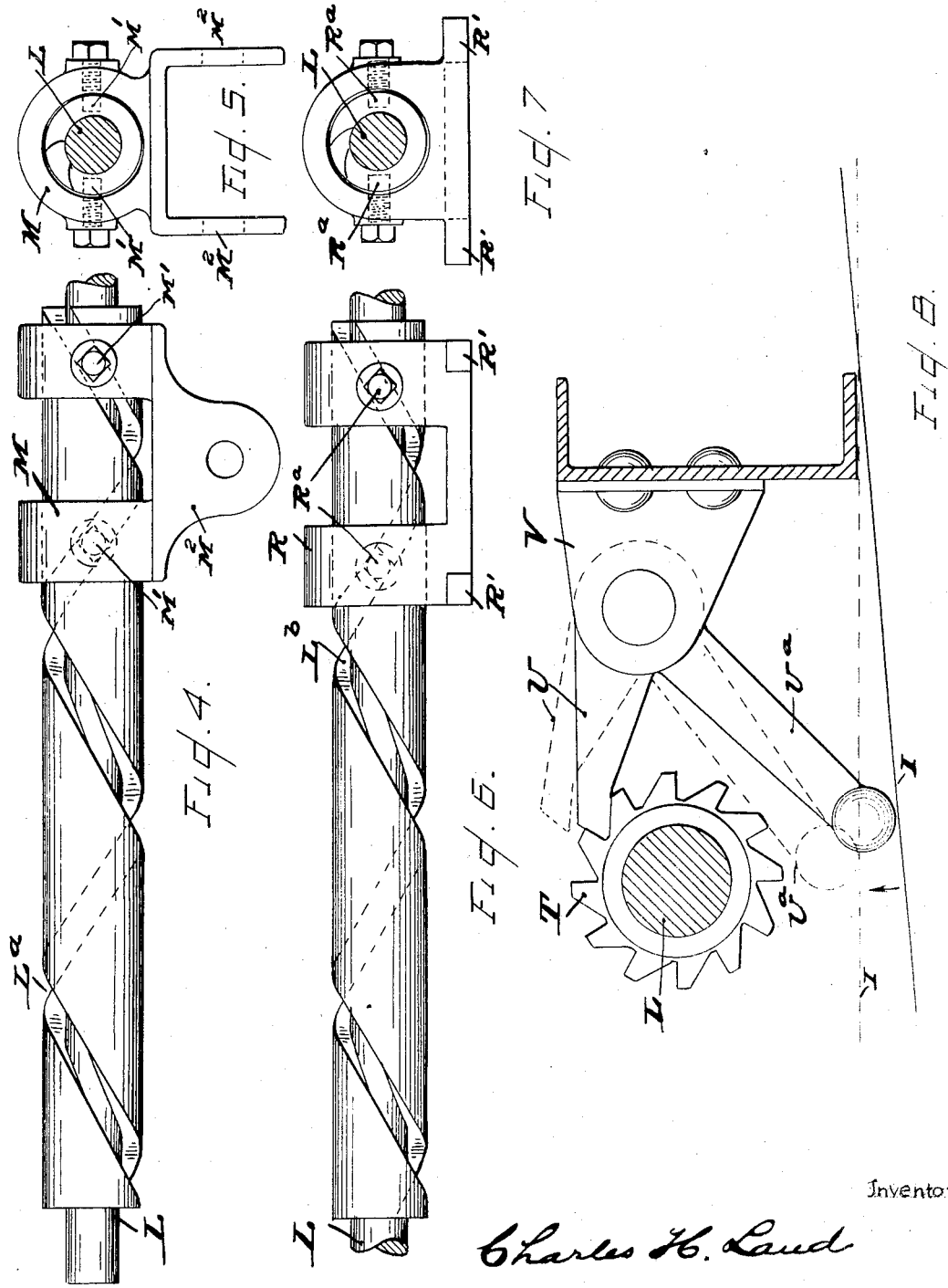
Inventor
Charles H. Land
by S. E. Thomas
Attorney Patented Oct. 9, 1928.

1,686,698

UNITED STATES PATENT OFFICE.

CHARLES H. LAND, OF DETROIT, MICHIGAN.

TRACTOR TRAILER.

Application filed May 4, 1927. Serial No. 188,663.

This invention relates primarily to a simple and inexpensive means for automatically raising and lowering the supporting leg of a semi-trailer, either upon coupling the tractor to the trailer or upon detaching the tractor from the latter.

In carrying this invention into effect a longitudinally disposed shaft journalled in the frame of the trailer is connected to the supporting leg of the latter in such manner that the rotary motion imparted to the shaft through a backward and forward movement of the tractor respectively raises and lowers the leg.

This result is attained by providing the longitudinally disposed shaft at its forward end with a helix on which is sleeved a head designed to co-ordinate with means carried by the tractor whereby the backward or forward movement of the latter may rotate said shaft through the action of said head and thus raise or lower the leg.

Another feature of the invention consists in a locking mechanism for the rotatable shaft so that the leg when lowered may be held in position to support the trailer until said locking mechanism is automatically released concurrently with the coupling operation.

With the foregoing and other objects in view which will appear as the description proceeds, the invention further resides in the combination and arrangement of parts and in the details of construction hereinafter described and claimed, it being understood that changes may be made in the precise embodiment of the invention herein shown without departing from the spirit of the same.

In the drawings accompanying this specification:

Figure 1 is a diagrammatic plan view of a trailer, showing mechanism embodying my invention, the forward end of the trailer being supported upon the fifth wheel of a tractor,—a fragment of which is shown.

Figure 2 is a diagrammatic side elevation of the same partly in section indicating the forward end of the trailer mounting the inclined tiltable member of the fifth wheel of the tractor, prior to the latter assuming a horizontal position, as when the tractor and trailer are coupled together.

Figure 3 is a fragmentary sectional elevation of the trailer and rear end of the tractor showing the cone-shaped impact lugs on the end of the trailer seated in the cone-shaped sockets of the buffer bracket supporting the coupling hooks,—the trailer being shown coupled by the hooks to the tractor.

Figure 4 is an enlarged detail view of the rear end of the longitudinally disposed drive shaft showing its helix and a travelling bracket sleeved thereon, to which the swinging supporting leg of the trailer is connected.

Figure 5 is an end elevation of the traveling bracket fitted with opposing pins extending into the helical groove of the drive shaft,—shown in cross-section.

Figure 6 is a detail view of the forward end of the rotatable drive shaft formed with a helix on which is mounted a travelling head having opposing pins extending into the helical groove on the shaft.

Figure 7 is an end elevation of the traveling head shown in the preceding figure, with the drive shaft in cross-section.

Figure 8 is a detail view on an enlarged scale of a ratchet wheel secured to the drive shaft with a locking pawl in mesh with the teeth of the ratchet to hold the drive shaft in its adjusted position until automatically released by the return of the fifth wheel to its horizontal position—as indicated by dotted lines.

Referring now to the letters of reference placed upon the drawings:

The trailer A, is constructed of the usual commercial shapes, and includes sills B, B spaced from each other with their flanges extending outwardly connected by cross-members C, C. At the forward end of the trailer are projecting brackets D, D riveted to the cross-member C, in which are journalled wheels E, E. F is a tractor fitted with ramps G, G to direct the wheels E, E into the channel tracks H, H on the tiltable member I, pivoted at J to the fifth wheel K. L is a longitudinally and medially disposed drive shaft journalled at $L^1$, $L^2$, $L^3$ in the respective transverse members C, C, C of the trailer frame.

The rear end of the drive shaft L is enlarged and formed with a helix $L^4$ on which is sleeved a head M provided with opposing pins $M^1$ $M^1$ supported in the wall of the head and extending into the groove or helix. The head M is provided with depending lugs $M^2$ to which are pivoted a pair of links P in turn pivoted to a pair of swinging legs Q, hinged to the trailer frame.

Mounted on the lower ends of the swinging legs are wheels $Q^1$ journalled in brackets $Q^2$ secured to the legs. Sleeved upon the enlarged forward end of the screw shaft is a travelling head R fitted with opposing pins $R^a$ extending into the spiral groove or helix $L^b$. The travelling head R is also provided on each side with a pair of impact lugs $R^1$, $R^1$ projecting from the head to receive between them a pair of posts S, S extending upwardly from the tiltable member I of the fifth wheel upon the latter assuming a horizontal position, following the coupling of the trailer to the tractor, hereafter more fully explained.

Secured to the forward end of the longitudinal shaft L is a ratchet wheel T, engaged by a swinging pawl U pivoted between the arms of a bracket V, bolted to the frame of the trailer. The pawl U is provided with a rocking arm $U^a$, the weight of which is adapted to maintain the pawl in engagement with the ratchet wheel T, but which also serves when the tiltable member I contacts with it, to release the pawl, upon said tiltable member assuming a horizontal position following the coupling of the trailer to the tractor.

Bolted to the tiltable member I of the fifth wheel are buffer brackets W, W having cone-shaped sockets $W^a$ to receive the cones X, X secured to the end sill of the trailer. Journalled in the brackets W, W is a shaft carrying a pair of swinging coupling hooks $W^1$, $W^1$ having rocking arm $W^2$ connected by a spring $W^3$ with a bracket $W^4$ attached to the tiltable member, suitable means—not shown—being provided to trip the coupling hooks against the action of the spring when it is desired to release the hooks.

Having indicated the several parts by reference letters, the construction and operation of my invention will be readily understood.

To effect a coupling operation, the tractor F is backed into the trailer A, whereupon the wheels E, E ride up the inclined ramps G, G on to the channel tracks H, H of the inclined tiltable member I of the fifth wheel K. This lifts the front end of the trailer and carries the wheels $Q^1$ of the supporting legs Q from the ground. As the backing continues the wheels E, E reach a position—see Figure 2—which is just beyond the transverse center-line of the fifth wheel causing the tiltable member I to assume a horizontal position bringing the posts S, S between the transversely extending impact lugs $R^1$, $R^1$, $R^1$, $R^1$ of the travelling head.

Upon the tiltable member I being brought to a horizontal position the arm $U^a$ of the locking pawl U is forced by the tiltable member I upwardly, disengaging the pawl from the teeth of the ratchet wheel T, keyed to the rotatable longitudinal shaft. It may be noted that this locking device is employed to insure the proper positioning of the impact lugs $R^1$, $R^1$, $R^1$, $R^1$ carried by the travelling head as the supporting legs Q have a tendency to move backward when the trailer is lifted from the ground in coupling it to the tractor.

Continuing the coupling operation, the impact lugs $R^1$ contact with the posts S, S projecting upwardly from the tiltable member I and in doing so force the travelling head R backward imparting a rotary motion to the drive shaft L due to the pins $R^a$ projecting from the head traversing the helical groove $L^b$ of the latter. The travelling head M, mounted on the helical portion at the rear end of the shaft and to which the supporting legs are connected is thus rotated thereby raising the latter from the ground.

The lifting action applied to the supporting legs are limited by the backward motion of the tractor. This is regulated by the buffer brackets W, W on the fifth wheel which receives the cones X, X attached to the forward end of the trailer.

Concurrently with the cones X, X entering the sockets of the buffers W, W, the coupling hooks $W^1$, $W^1$ engage the lower flange of the forward cross-member C, connecting the side sills B, B of the trailer.

As previously indicated, suitable means—not shown—are employed to release the coupling hooks $W^1$, $W^1$ when required—this however forms no part of the present invention.

Having thus described my invention what I claim is:

1. In combination with a tractor-trailer, a rotatable shaft journalled in the frame of the trailer and extending longitudinally thereof; a supporting element for the trailer adapted to be moved into supporting or non-supporting position by the rotation of said shaft; and means carried by the tractor adapted to co-operate with the front end of the shaft to effect its rotation through a backward or forward movement of the tractor.

2. In combination with a tractor-trailer, a rotatable shaft journalled in the frame of the trailer and extending longitudinally thereof; a supporting element for the trailer adapted to be moved into supporting or non-supporting position by the rotation of said shaft; means for automatically locking and releasing said shaft when the supporting element is raised or lowered; and means carried by the tractor adapted to co-operate with the front end of the shaft to effect its rotation through a backward or forward movement of the tractor.

3. In combination with a tractor-trailer, a helically grooved shaft journalled in the frame of the trailer; a longitudinally movable block mounted upon one end of the shaft having projecting elements extending into the helical groove of the shaft; a swinging leg hinged to the frame of the trailer adapted to support the latter when detached from the tractor; a link connection between the leg and the travelling block; a longitudinally movable head sleeved upon the forward end of the shaft having projecting elements extending into the helical grooves of the shaft; means for coupling the tractor to the trailer; means carried by the tractor adapted to engage the longitudinally movable head, whereby the helically grooved shaft may be rotated to raise or lower the supporting leg of the trailer concurrently with the act of coupling or uncoupling the tractor and trailer.

4. In combination with a tractor-trailer, a rotatable shaft helically grooved at each end and journalled in the frame of the trailer; a travelling block mounted upon one end of the shaft having projecting elements extending into its helical grooves, whereby the block is caused to move longitudinally along the shaft upon rotating the latter; a swinging leg hinged to the trailer frame adapted to support the trailer when detached from the tractor; a link connection between the leg and the travelling block; a travelling head sleeved upon the forward end of the shaft having projecting elements extending into the helical grooves of the latter; means for coupling the tractor to the trailer; means carried by the tractor adapted to engage the travelling head, whereby said shaft may be rotated to raise or lower the supporting leg of the trailer concurrently with a limited movement of the tractor in relation to the trailer in effecting the coupling or uncoupling of the tractor and trailer.

5. In combination with a tractor-trailer, a longitudinally helically grooved rotatable shaft journalled in the frame of the trailer; a travelling block mounted upon one end of the shaft; elements carried by the block extending into the helical grooves of the shaft; a swinging leg hinged to the frame of the trailer adapted to support the latter; a link connection between the leg and travelling block; a travelling head sleeved upon the forward end of the shaft; means extending from the head into the helical grooves of the latter; means for coupling the tractor to the trailer; a fifth wheel carried by the trailer including a tiltable member adapted to receive and support the forward end of the trailer when in coupled relation with the tractor; means carried by the tiltable member adapted to enter between spaced abutments on the travelling head, whereby a limited forward or backward movement of the tractor with reference to the trailer while uncoupled may shift the travelling head causing the rotation of said helically grooved shaft to effect the raising or lowering of the leg, substantially coincident with the operation of the means for coupling or uncoupling the tractor and trailer.

6. In combination with a tractor-trailer, a helically grooved rotatable shaft journalled in the frame of the trailer; a travelling block mounted upon one end of the shaft having means extending into the helical grooves, whereby the block is caused to move longitudinally along the shaft upon the latter being rotated; a swinging leg hinged to the trailer frame adapted to support the trailer when disconnected from the tractor; means connecting the leg with the travelling block; a travelling head sleeved on the forward end of the shaft having means extending into the helical grooves to effect the rotation of the shaft; means for coupling the tractor to the trailer; automatic means for securing said rotatable shaft when adjusted to secure the leg of the trailer when in supporting position; and means for automatically releasing said shaft holding means concurrently with the coupling of the tractor and trailer.

7. In combination with a tractor-trailer, a helically grooved rotatable shaft journalled in the frame of the trailer; a travelling block mounted upon one end of the shaft having means extending into the helical grooves, whereby the block is caused to move longitudinally along the shaft upon the latter being rotated; a swinging leg hinged to the trailer frame adapted to support the trailer when disconnected from the tractor; a link connection between the leg and the travelling block; a travelling head sleeved upon the forward end of the shaft having means extending into the helical grooves to effect the rotation of the shaft; means for coupling the tractor to the trailer; a ratchet wheel secured to the rotatable shaft; a pawl adapted to engage said ratchet wheel whereby the swinging leg may be held against release when supporting the trailer; means adapted to automatically release said pawl upon the tractor effecting a coupling relation with the trailer; and means carried by the tractor adapted to engage the travelling head, whereby the shaft may be rotated to raise or lower the supporting leg of the trailer by a backward or forward movement of the tractor substantially coincident with the coupling or uncoupling of the tractor and trailer.

8. In combination with a tractor-trailer, a supporting element for the trailer adapted to be moved into supporting or non-supporting position, a rotatable shaft journaled in the frame of the trailer and extending longitudinally thereof, means located at the rear portion of the shaft and actuated by the rotation of the same to move the said supporting element to and from its supporting position, and means cooperating with the front end of the shaft and actuated by the tractor for rotating the shaft when the tractor and trailer are coupled and uncoupled.

9. In combination with a tractor-trailer, a supporting element for the trailer adapted to be moved into supporting or non-supporting position, a rotatable shaft journaled in the frame of the trailer and extending longitudinally thereof and actuated by the tractor in the coupling and uncoupling operations of the tractor and trailer, and means cooperating with the rear portion of the shaft and actuated by the rotation of the same for moving the supporting element into and out of supporting position.

In testimony whereof, I sign this specification.

CHARLES H. LAND.